United States Patent
Harada et al.

[11] Patent Number: 5,830,402
[45] Date of Patent: Nov. 3, 1998

[54] PROCESS FOR PRODUCING MULTILAYER MOLDED ARTICLES

[75] Inventors: Hiroyuki Harada; Kenichi Higashi, both of Ichihara; Masahito Matsumoto, Ibaraki; Nobuhiro Usui, Takatsuki, all of Japan

[73] Assignee: Sumitomo Chemical Company, Limited, Osaka, Japan

[21] Appl. No.: 665,838

[22] Filed: Jun. 17, 1996

Related U.S. Application Data

[63] Continuation of Ser. No. 97,992, Jul. 29, 1993, abandoned.

[30] Foreign Application Priority Data

Jul. 31, 1992 [JP] Japan ..................... 4-205296

[51] Int. Cl.⁶ .................................................. B29C 45/16
[52] U.S. Cl. .................... 264/266; 264/259; 264/328.16; 264/328.18
[58] Field of Search ............... 264/328.16, 250, 264/259, 266, 267, 328.18, 268

[56] References Cited

U.S. PATENT DOCUMENTS

| | | | |
|---|---|---|---|
| 4,404,161 | 9/1983 | Bier | 264/328.16 |
| 4,968,474 | 11/1990 | Ito | 264/266 |
| 5,122,320 | 6/1992 | Masui et al. | 264/266 |
| 5,154,872 | 10/1992 | Masui et al. | . |
| 5,238,640 | 8/1993 | Masui et al. | 264/266 |
| 5,352,397 | 10/1994 | Hara et al. | 264/266 |

FOREIGN PATENT DOCUMENTS

| | | |
|---|---|---|
| 1235613 | 9/1989 | Japan . |
| 2-80218 | 3/1990 | Japan . |
| A-4364910 | 12/1992 | Japan . |

*Primary Examiner*—Angela Ortiz
*Attorney, Agent, or Firm*—Pillsbury Madison & Sutro LLP

[57] ABSTRACT

A multilayer molded article comprising a skin and a substrate consisting of a polypropylene resin composition having a crystallization rate of 45 second or less, said skin being integrally adhered to the substrate. Said multilayer molded article can be produced by feeding a skin material and a molten polypropylene resin composition having a crystallization rate of 45 second or less between a pair of upper and lower molds, molding the molten polypropylene resin composition in the molds with simultaneous adhering of the skin material to the surface of the molded resin composition and then cooling the molten resin composition to solidify the same. Said multilayer molded article has a small deformation degree without the soft feeling of the skin material being impaired.

16 Claims, 2 Drawing Sheets

PROCESS FOR PRODUCING MULTILAYER MOLDED ARTICLES

This is a continuation of application Ser. No. 08/097,992, filed on Jul. 29, 1993, which was abandoned upon the filing hereof.

BACKGROUND OF THE INVENTION

This invention relates to a multilayer molded article comprising a skin and a substrate consisting of a polypropylene resin composition having a specific crystallization rate.

Multilayer molded articles comprising a skin and a substrate consisting of a resin such as polypropylene or the like have been much used in a wide field such as automobile interior parts, household electric appliances and the like from the viewpoint of economy, light weight, and good moldability.

Such multilayer molded articles are produced, as described in, for example, U.S. Pat. No. 5,154,872, by feeding a molten thermoplastic resin between a pair of male and female molds in which a skin material has already been placed, clamping the two molds to mold the molten resin in the molds and simultaneously adhere the skin material to the surface of the molded resin, and then cooling the molten resin to solidify the same.

However, when molded articles are produced by known processes, the resulting multilayer molded articles are sometimes deformed, and this deformation not only makes appearance bad but also causes troubles in the course of production of a final article from the multilayer molded articles, whereby the production efficiency is remarkably affected.

In order to prevent such deformation from being caused, it is effective to apply a sufficient pressure during the clamping of the molds in the molding process and then sufficiently cool the molten resin; however, this process has such problems that it requires a long molding cycle and hence is inferior in productivity, or the soft feeling of the skin material is lost in the resulting molded article. Thus, the above process is not practical.

SUMMARY OF THE INVENTION

Under such circumstances, the present inventors have made extensive research on producing a multilayer molded article, the deformation of which is small, without adversely affecting the productivity and appearance of the product, and have, as a result, found that this object can be achieved by using as a substrate resin a polypropylene resin composition having a crystallization rate not greater than a certain value.

In one aspect, this invention provides a multilayer molded article comprising a skin and a substrate consisting of a polypropylene resin composition having a crystallization rate of 45 second or less, said skin being integrally adhered to the surface of the substrate.

In another aspect, this invention provides a process for producing a multilayer molded article comprising a skin and a substrate consisting of a thermoplastic resin, which process comprises feeding a skin material and a molten thermoplastic resin as a substrate material between a pair of upper and lower molds, molding the molten resin in the molds with simultaneous adhering of the skin material to the surface of the molded resin, and then cooling the molten resin to solidify the same, characterized in that the thermoplastic resin is a polypropylene resin composition having a crystallization rate of 45 second or less.

DETAILED DESCRIPTION OF THE INVENTION

Figure 1A:
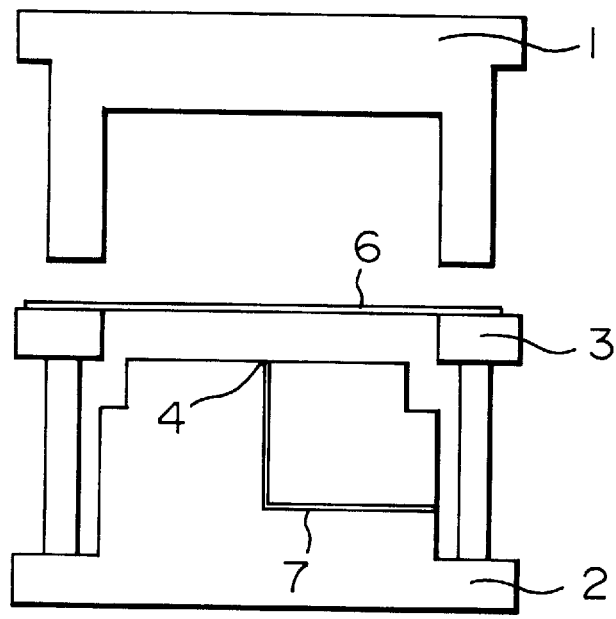
FIGS. 1A to 1C show an outline of a press-molding apparatus which is an embodiment of producing the present multilayer molded article and also show the successive steps of the present molding process.

The thermoplastic resin used as a substrate material in this invention is a polypropylene resin composition obtained by adding an appropriate amount of a crystallization rate-controlling agent (referred to hereinafter as a nucleating agent) to a polypropylene resin such as a conventional propylene homopolymer or copolymer or a resin composition consisting of the polypropylene resin, a stabilizer and other compounding agents such as inorganic filler and the like to control the crystallization rate of the polypropylene resin composition to 45 second or less, preferably 35 second or less.

In this invention, it is very important to use a polypropylene resin composition having a crystallization rate adjusted to 45 second or less, preferably 35 second or less. When a polypropylene resin composition having a crystallization rate of more than 45 second is used, the deformation degree of the molded article obtained is great and the purpose of this invention cannot be achieved.

The nucleating agent used for controlling the crystallization rate includes, for example, metal salts of organic acids such as aluminum p-t-butylbenzoate, sodium bis(4-t-phenyl) phosphate and the like; sorbitol compounds such as dibenzylidenesorbitol, 1,3,2,4-di-p-methylbenzylidenesorbitol, 1,3,2,4-di-p-ethylbenzylidenesorbitol and the like. However, any nucleating agent can be used as far as it can adjust the crystallization rate to 45 second or less.

The crystallization rate may be varied depending upon the kind of nucleating agent, the polypropylene resin composition used and the like, and hence, the amount of the nucleating agent is appropriately determined depending upon the various conditions. Thus, the amount of the nucleating agent is not critical. For example, when aluminum p-t-butylbenzoate is used as the nucleating agent, it is added so that the proportion of this compound becomes 0.05–0.3% by weight based on the weight of the polypropylene resin composition.

The term "crystallization rate" used herein means a value obtained by melting the polypropylene resin composition, subjecting the same to isothermal crystallization at 130° C. and measuring the time required for crystallization of ½ of the total amount of the resin to be crystallized by means of a differential scanning calorimeter (DSC).

The polypropylene resin composition used in this invention is required to have a crystallization rate of 45 second or less, and moreover, it is suitable that the polypropylene resin composition has a melt index (MI) of 20 or more, preferably 30 or more, from the viewpoint of effecting the molding of the molten resin to form a multilayer molded article at a relatively low pressure. The upper limit of the melt index is not critical in relation to deformation; however, it is usually 200, preferably 150 from the viewpoint of physical properties.

The term "MI" used herein means a value obtained by measurement according to JIS K7210 (230° C., 2.16 kg).

The skin material used in this invention is not critical, and various materials can be used. It includes, for example, woven, knit and non-woven fabrics composed of various starting materials, and sheets and films of thermoplastic resins and thermoplastic elastomers. These may be embossed. The skin material also includes foams of various resins such as polyolefins, polyvinyl chloride, polystyrene, polyurethane and the like and rubber foams of cis-1,4-butadiene polymers, ethylene-propylene copolymer and the like. The above-mentioned materials may be used alone or in the form of a laminate of two or more.

In the use of such a skin material, preheating or preforming may be previously applied thereto in order to adjust the tensile stress, elongation and the like.

As far as a polypropylene resin composition having a crystallization rate of 45 second or less is used as a substrate material, the multilayer molded article of this invention can be produced by a known, general molding method for a thermoplastic resin which comprises feeding a skin material and a molten thermoplastic resin between a pair of molds, molding the resin in the molds with simultaneous adhering of the skin material to the surface of the molded resin, and then cooling the molten resin to solidify the same, thereby forming a multilayer molded article consisting of a skin and a substrate consisting of the thermoplastic resin, such as a press molding method, injection molding method or the like, and the molding method is not critical. However, the press molding method is preferred because substantially no strain or the like is caused.

An example of producing the multilayer molded article of this invention is explained below referring to FIGS. 1A to 1C.

Figure 1B:
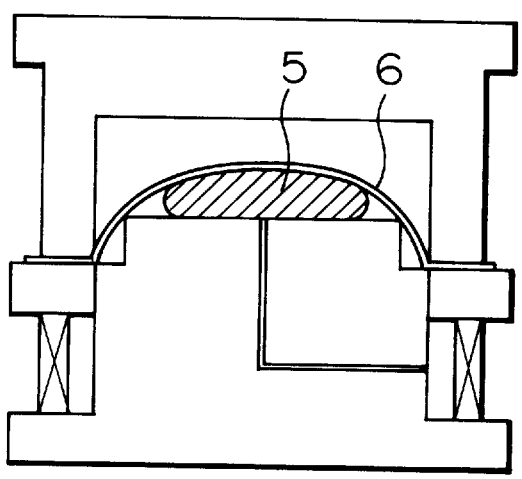
Figure 1C:
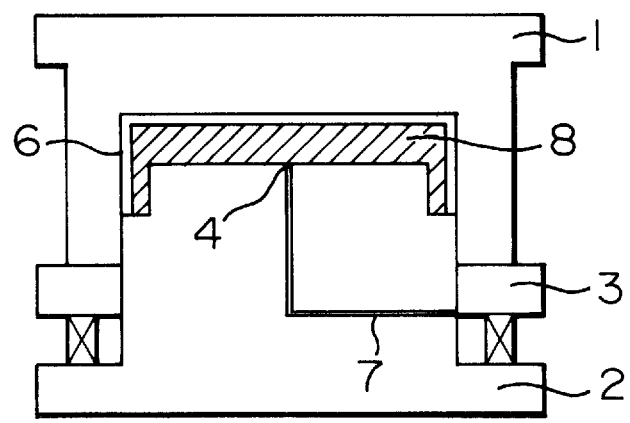

The press molding apparatus in this example consists of a pair of upper mold (1) and lower mold (2), as shown in FIGS. 1A to 1C, and a damper (3) which can be moved upward and downward by means of hydraulic pressure, pneumatic pressure, spring or the like is arranged about the outer periphery of the lower mold (2) for putting the skin material (6) on the clamper.

The clamper (3) may be provided at its upper end with pins (not shown) for controlling the elongation of the skin material (6), and the control and adjustment of elongation of the skin material are effected with these pins or by adjusting the power of fastening the skin material sandwiched in between the upper surface of the damper (3) and the lower surface of the peripheral portion of the upper mold (1).

The mold surface of the lower mold (2) is provided with an opening (4) for feeding the molten polypropylene resin composition sent through a resin path (7). Incidentally, either one or both of the molds may be provided, if necessary, with a piping for cooling.

An explanation is made below of a specific production method using the above-mentioned apparatus.

In the state that the lower mold (2) and the upper mold (1) are opened, the skin material (6) is put on the upper surface of the damper (3) (see Fig. 1A), and the upper mold (1) is allowed to fall down to an appropriate position as shown in FIG. 1B, after which the molten polypropylene resin composition (5) is fed between the skin material (6) and the lower mold (2) from the resin-feeding opening (4) (see FIG. 1B). While the molten resin is fed, or after the feeding of the desired amount of the molten resin has been completed, the upper mold (1) is further allowed to fall down to clamp the molds, whereby the molten polypropylene resin composition (5) is spread in the cavity formed by the molds and molded and simultaneously adhered to the skin material (see FIG. 1C). After cooling, the molds are opened and the molded article is taken out.

By the above method, there can be obtained a multilayer molded article (9) in which the skin material (6) has been integrally and firmly adhered to the surface of the substrate resin (8) consisting of the polypropylene resin composition.

The above-mentioned apparatus and the above-mentioned production method using the apparatus are merely an embodiment, and the present invention is not limited thereto.

In the following Examples, % and parts are by weight unless otherwise specified.

EXAMPLE 1

Preparation of polypropylene resin composition

| | |
|---|---|
| Polypropylene block copolymer (ethylene content = 8.2%, MI = 35) | 81.9% |
| Talc (Micronwhite 5000S' manufactured by Hayashi Kasei K.K.) | 18.0% |
| Aluminum p-t-butylbenzoate | 0.1% |

To 100 parts by weight of a mixture of the these components were added as stabilizers 0.1 part of Irganox 1010 (phenol type stabilizer manufactured by Geigy) and 0.15 part of Ultranox 626 (phosphite type antioxidant manufactured by General Electric). The resulting resin mixture was kneaded in a twin-screw kneader and pelletized to form polypropylene resin composition pellets. Incidentally, a small amount of 2,5-dimethyl-2,5-di(t-butylperoxy)hexane was added during the kneading to adjust the MI to 40. The crystallization rate of the polypropylene resin composition was 30.4 second.

Preparation of multilayer molded article

Using the press-molding apparatus shown in FIGS. 1A to 1C, a multilayer molded article consisting of a skin and a substrate consisting of a polypropylene resin composition was prepared by the following press-molding method:

On the damper (3) was put a skin material (a laminate consisting of a polypropylene elastomer sheet having a thickness of 0.5 mm and a polypropylene foam sheet having a thickness of 3 mm and a foaming magnification of 15) so that the foam sheet faced the clamper, and thereafter, the upper mode (1) was allowed to fall down. The polypropylene resin composition (5) was previously melted, and the molten polypropylene resin composition (5) was fed between the skin material (6) and the lower mold (2) from the resin-feeding opening (4) through the resin path (7).

After the desired amount of the resin had been fed, the upper mold (1) was further allowed to fall down to clamp the molds, and thereafter, the molded resin was cooled.

The molds were opened to obtain a box-shaped multilayer molded article (9) having a length of 2300 mm, a width of 750 mm, a depth of 100 mm and a resin layer thickness of 3 mm.

The molding conditions were as follows:

Molten resin temperature: 200° C.

Mold temperature: upper mold, 30° C.; lower mold, 35° C.

Cooling time under pressure: 40 second

The pressing pressure required for the molding was 60 kg/cm$^2$ of unit area of the molded article obtained.

Figure 2:
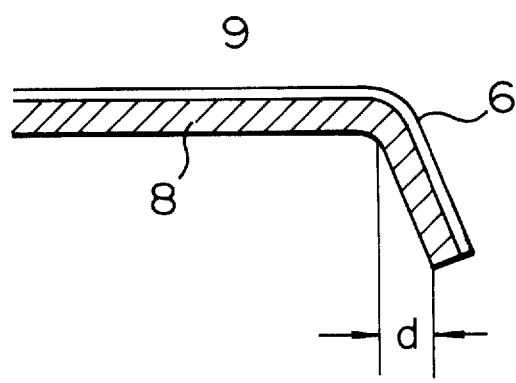
FIG. 2 is a partial view of a multilayer molded article in which d shows a deformation degree.

The deformation degree d of the molded article obtained was 4 mm. Incidentally, the deformation degree d was evaluated by the difference of the end of the deformed horizontal wall from its position before the deformation (see d in FIG. 2) in the cross-section at about the center portion of the molded article obtained. The smaller the d value, the smaller the deformation degree.

EXAMPLE 2

The same procedure as in Example 1 was repeated, except that the MI was adjusted to 20 during the kneading, to obtain a multilayer molded article.

The deformation degree d of the molded article obtained was 4 mm and the pressing pressure required for the molding was 100 kg/cm$^2$ of unit area of the molded article.

EXAMPLE 3

| | |
|---|---|
| Polypropylene block copolymer (PD 7035 manufactured by Exson) | 81.8% |
| Talc (MP 1250 manufactured by Pfizer) | 18.0% |
| Aluminum p-t-butylbenzoate | 0.2% |

To 100 parts by weight of a mixture of these components were added as stabilizers 0.1 part of Irganox (phenol type stabilizer manufactured by Geigy) and 0.15 part of Ultranox 626 (phosphite type antioxidant manufactured by General Electric), and a small amount of 2,5-dimethyl-2,2-di(t-butylperoxy)hexane was added to the mixture to adjust the MI to 40. The resulting mixture was kneaded in a twin-screw kneader and then pelletized to obtain polypropylene resin composition pellets. The crystallization rate of the polypropylene resin composition was 25.8 second.

In the same manner as in Example 1, the polypropylene resin composition pellets thus obtained were subjected to molding treatment to obtain a multilayer molded article.

The deformation degree d of the molded article was 3 mm and the pressing pressure required for the molding was 60 kg/cm$^2$ of unit area of the molded article obtained.

EXAMPLE 4

The same procedure as in Example 1 was repeated, except that a polypropylene block copolymer having an ethylene content of 4.5% and an MI of 50 was substituted for the polypropylene resin, to obtain a polypropylene resin composition having an MI of 40. The crystallization rate of the polypropylene resin composition obtained was 25.8 second.

In the same manner as in Example 1, the polypropylene resin composition was subjected to molding treatment to obtain a multilayer molded article.

The deformation degree d of the multilayer molded article obtained was 2.5 mm, and the pressing pressure required for the molding was 60 kg/cm$^2$ of unit area of the molded article obtained.

Comparative Example 1

| | |
|---|---|
| Polypropylene block copolymer (PD 7035 manufactured by Exson) | 82% |
| Talc (Micronwhite 5000S' manufactured by Hayashi Kasei K.K.) | 18% |

To 100 parts by weight of a mixture of these components were added as stabilizers 0.1 part of Irganox 1010 (phenol type antioxidant manufactured by Geigy) and 0.15 part of Ultranox 626 manufactured by General Electric), and a small amount of 2,5-dimethyl-2,5-di(t-butylperoxy)hexane was added to the mixture to adjust the MI of the mixture to 40. The resulting mixture was kneaded in a twin-screw kneader and then pelletized to obtain polypropylene resin composition pellets. The crystallization rate of the polypropylene resin composition was 57.6 second.

In the same manner as in Example 1, the polypropylene resin composition pellets were subjected to molding treatment to obtain a multilayer molded article.

The deformation degree d of the multilayer molded article was 7 mm and the pressing pressure required for the molding was 60 kg/cm$^2$ of unit area of the molded article obtained.

Comparative Example 2

| | |
|---|---|
| Polypropylene block copolymer (PD 7035 manufactured by Exson) | 78% |
| Talc (MP 1250 manufactured by Pfizer) | 22% |

To 100 parts by weight of a mixture of these components were added as stabilizers 0.1 part of Irganox (phenol type stabilizer manufactured by Geigy) and 0.15 part of Ultranox 626 (phosphite type antioxidant manufactured by General Electric), and a small amount of 2,5-dimethyl-2,5-di(t-butylperoxy)hexane was added to the mixture to adjust the MI to 40. The resulting mixture was kneaded in a twin-screw kneader and then pelletized to obtain polypropylene resin composition pellets. The crystallization rate of the polypropylene resin composition was 58.8 second.

In the same manner as in Example 1, the polypropylene resin composition pellets were subjected to molding treatment to obtain a multilayer molded article.

The deformation degree d of the multilayer molded article obtained was 8 mm and the pressing pressure required for the molding was 60 kg/cm$^2$ of unit area of the molded article obtained.

According to the present invention, a polypropylene resin composition having a specific crystallization rate is used as the substrate resin, and this enables one to obtain a multilayer molded article having a small deformation degree without impairing the soft feeling of the skin material by the known molding method without any special modification being applied thereto. Since the deformation degree of the molded article thus obtained is small, the appearance is good, and final products can be easily obtained using the multilayer molded article as the starting material.

What is claimed is:

1. A process for producing a multilayer molded article wherein said article comprises a skin and a substrate consisting of a thermoplastic resin, which process comprises (a) feeding a skin material and a molten thermoplastic resin between a pair of upper and lower molds, (b) molding the molten resin in the molds whereby there is simultaneous adhering of the skin material to the surface of the molded resin, and then (c) cooling the molten resin to solidify the same, wherein said thermoplastic resin is a polypropylene resin composition having a crystallization rate of 45 seconds or less and whereby deformation of the multilayer molded article is substantially prevented.

2. A process for producing a multilayer molded article wherein said article comprises a skin and a substrate consisting of a thermoplastic resin, which process comprises (a) feeding a skin material between an unclosed pair of upper and lower molds, (b) allowing the upper mold to close to a predetermined position, (c) feeding a molten thermoplastic resin between the skin material and the lower mold, (d) allowing the upper mold to close further while feeding the molten thermoplastic resin or after completion of feeding the predetermined amount of the molten thermoplastic resin, (e) clamping the upper and lower molds together and molding the molten thermoplastic resin in the molds to thereby simultaneously adhere the skin material to the surface of the molded resin, and then (f) cooling the molten resin to solidify the same, wherein said thermoplastic resin is a polypropylene resin composition having a crystallization rate of 45 seconds or less and whereby deformation of the multilayer molded article is substantially prevented.

3. A process according to claim 1 or 2, wherein the polypropylene resin composition has a melt index of 20 or more.

4. A process according to claim 1 or 2, wherein the polypropylene resin composition has a crystallization rate of 35 seconds or less.

5. A process according to claim 1 or 2, wherein the crystallization rate is a value obtained by melting the polypropylene resin composition, subjecting the polypropylene resin composition to isothermal crystallization of 130° C. and measuring the time required for crystallizing ½ of the total amount of resin to be crystallized by means of a differential scanning calorimeter.

6. A process according to claim 1, wherein said polypropylene resin contains a nucleating agent for controlling the crystallization rate, and said nucleating agent is a metal salt of an organic acid or a sorbitol compound.

7. A process according to claim 6, wherein said nucleating agent is aluminum p-t-butylbenzoate, sodium bis(4-t-phenyl) phosphate, dibenzylidenesorbitol or 1,3,2,4-di-t-ethyl benzylidenesorbitol.

8. A process according to claim 7, wherein said nucleating agent is present in an amount of 0.05–0.3% by weight based on the weight of the polypropelene resin composition and wherein said nucleating agent is aluminum p-t-butybenzoate.

9. A process according to claim 1 or 2, wherein the polypropelene resin composition has a melt index of at least 20, and said polypropylene resin composition has a crystallization rate of up to 35 seconds.

10. A process according to claim 1 or 2, wherein the polypropylene resin composition has a melt index of at least 20, and said polypropylene resin composition has a crystallization rate of up to 35 seconds, and said crystallization rate represents a value obtained by melting the polyprypelene resin composition, subjecting the polypropylene resin composition to isothermal crystallization at 130° C. and measuring the time required for crystallizing one-half of the total amount of resin to be crystallized by means of a differential scanning calorimeter.

11. A method of preventing generation of deformities in a multilayer molded article comprised a skin and a thermoplastic resin, wherein a polypropylene resin composition having a crystallization rate of 45 seconds or less is used as the thermoplastic resin in the process for producing the multilayer molded article.

12. A method according to claim 11, wherein the multilayer molded article is produced by the steps of: (1) feeding a skin material and a molten thermoplastic resin between a pair of upper and lower molds, (2) molding the molten resin in the molds whereby there is simultaneous adhering of the skin material to the surface of the molten resin, and (3) cooling the molten resin to solidify the same.

13. A method according to claim 11, wherein the multilayer molded article is produced by the steps of: (a) feeding a skin material between an open pair of upper and lower molds, (b) allowing the upper mold to close to a predetermined position, (c) feeding a molten thermoplastic resin between the skin material and the lower mold, (d) allowing the upper mold to further close while feeding the molten thermoplastic resin or after completing of feeding the predetermined amount of the molten thermoplastic resin, (e) closing and clamping the upper and lower molds together and molding the molten thermoplastic resin in the molds to thereby simultaneously adhere the skin material to the surface of the molded resin, and (f) cooling the molten resin to solidify the same.

14. A method according to claim 11, wherein said polypropylene resin contains a nucleating agent and for controlling the crystallization rate, and said nucleating agent is a metal salt of an organic acid or a sorbitol compound.

15. A method according to claim 14, wherein said nucleating agent is aluminum p-t-butylbensorbitol or 1,3,2,4-di-t-ethyl benzylidenesorbitol.

16. A method according to claim 15, wherein said nucleating agent and is aluminum p-t-butylbenzoate.

* * * * *